(12) United States Patent
Brobeck

(10) Patent No.: US 7,454,846 B2
(45) Date of Patent: Nov. 25, 2008

(54) AUTOMATIC TENNIS COURT DRYING MACHINE

(76) Inventor: William I. Brobeck, 1125 Bollinger Canyon Rd., Moraga, CA (US) 94556

( * ) Notice: Subject to any disclaimer, the term of this patent is extended or adjusted under 35 U.S.C. 154(b) by 104 days.

(21) Appl. No.: 11/784,816

(22) Filed: Apr. 10, 2007

(65) Prior Publication Data
US 2007/0234502 A1 Oct. 11, 2007

Related U.S. Application Data

(60) Provisional application No. 60/791,481, filed on Apr. 11, 2006.

(51) Int. Cl.
*F26B 5/14* (2006.01)
*F26B 5/16* (2006.01)
(52) U.S. Cl. ............... 34/397; 34/418; 34/60; 34/69; 34/71; 34/528; 34/95.3
(58) Field of Classification Search ............ 34/397, 34/418, 443, 524, 528, 529, 60, 69, 70, 71, 34/95, 95.3; 15/364, 401, 405, 98, 49.1
See application file for complete search history.

(56) References Cited

U.S. PATENT DOCUMENTS 6,189,179 B1 * 2/2001 Baird ..................... 15/364

6,298,578 B1 * 10/2001 Frampton ................. 34/465
2008/0098611 A1 * 5/2008 Dancel ..................... 34/71

FOREIGN PATENT DOCUMENTS

JP          63196839 A  *  8/1988
JP      2006335298 A  *  12/2006

* cited by examiner

*Primary Examiner*—Jiping Lu
(74) *Attorney, Agent, or Firm*—Bruce H. Johnsonbaugh

(57) ABSTRACT

An apparatus and method for automatically drying a tennis court or other flat surface after rainfall is provided. A robotic vehicle cooperates with a sensing unit preferably mounted on a fence adjacent the court or other paved surface. A sensing unit detects the onset and cessation of rain and then waits a predetermined amount of time. After waiting, the sensing unit transmits a signal to the robotic vehicle which actuates the vehicle. The robotic vehicle includes an on-board controller which is internally programmed with a map of the court including obstructions. The robotic vehicle automatically sponge rolls the entire court. A thermal imaging camera connected to the sensing unit then scans the court to determine if any wet spots remain. The location of any remaining wet spots is recorded and transmitted to the on-board controller of the robotic vehicle. The robotic vehicle then returns to the location of the wet spots and automatically sponge rolls and fan dries those remaining wet spots. The robotic vehicle then returns to a storage unit on or adjacent the paved surface where it is recharged and waits for further use.

6 Claims, 3 Drawing Sheets

AUTOMATIC TENNIS COURT DRYING MACHINE

CROSS-REFERENCE TO RELATED APPLICATION

This application claims the benefit of and priority from U.S. provisional application Ser. No. 60/791,481 filed Apr. 11, 2006.

BACKGROUND AND SUMMARY OF INVENTION

The automatic tennis court drying machine (ATCDM) of the present invention is a robotic device that cooperates with stationary sensors to allow the owner/user to minimize the effort in drying the surface of a tennis court or any other flat paved surface after rain. Prior art devices are known for drying tennis courts, including manually steered, motor powered machines with a sponge roller (U.S. Pat. No. 4,989,293), hand operated sponge rollers (U.S. Pat. Nos. 3,967,339 and 5,115,579) and drying machines (U.S. Pat. No. 6,298,578).

The present invention provides for the first time (to the knowledge of applicant) a fully automatic machine for drying tennis courts and other flat, paved surfaces. The present invention senses the presence of rain, the cessation of rain, and after a predetermined waiting period, automatically sponge rolls the court (or other surface). After sponge rolling, an automatic thermal imaging camera senses the location of remaining puddles or similar wet spots. The automatic, robotic unit of the invention travels to those wet spots. The robotic unit automatically sponge rolls and fan dries the remaining wet spots. The robotic unit then automatically returns to its storage unit to await further use. It is automatically recharged when stored.

A primary object of the invention is to provide an automatic system for drying a tennis court or other, flat paved surface.

Other objects and advantages will become apparent from the detailed description and drawings, wherein:

DETAILED DESCRIPTION OF DRAWINGS

Figure 1:
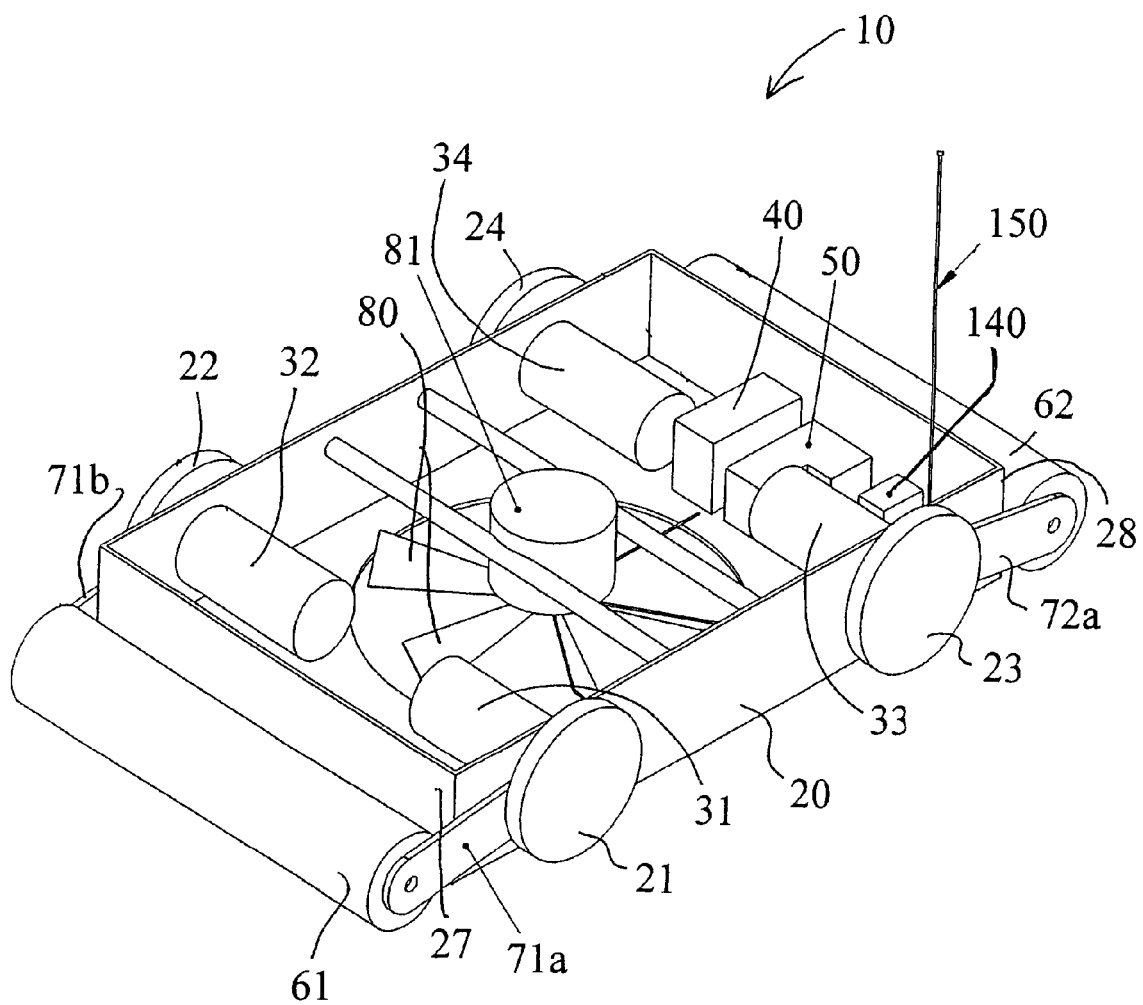
FIG. 1 is a perspective view of the robotic vehicle used in the invention.

FIG. 1 illustrates the fully automatic, robotic vehicle 10 of the invention. The basic elements of the vehicle 10 are a chassis 20 and preferably four wheels 21-24 supporting the chassis 20. The wheels 21-24 are connected to, and preferably separately driven by, motors 31-34 which are powered by a battery 40. The motors 31-34 are controlled by an on-board computerized controller module 50. The robotic vehicle 10 is guided by sensors (not shown) and internal programming including internal data storage in controller module 50. The vehicle 10 also has one or more sponge rollers 61 and 62. Rollers 61,62 are the primary devices that will push the excess water off the court and will spread the puddles to aid in the court drying. The rollers 61,62 are supported by arms 71a,71b and 72a,72b which can raise each roller in response to controller 50. A motorized fan 80, driven by motor 81, is used to aid in the drying of the court.

Figure 2:
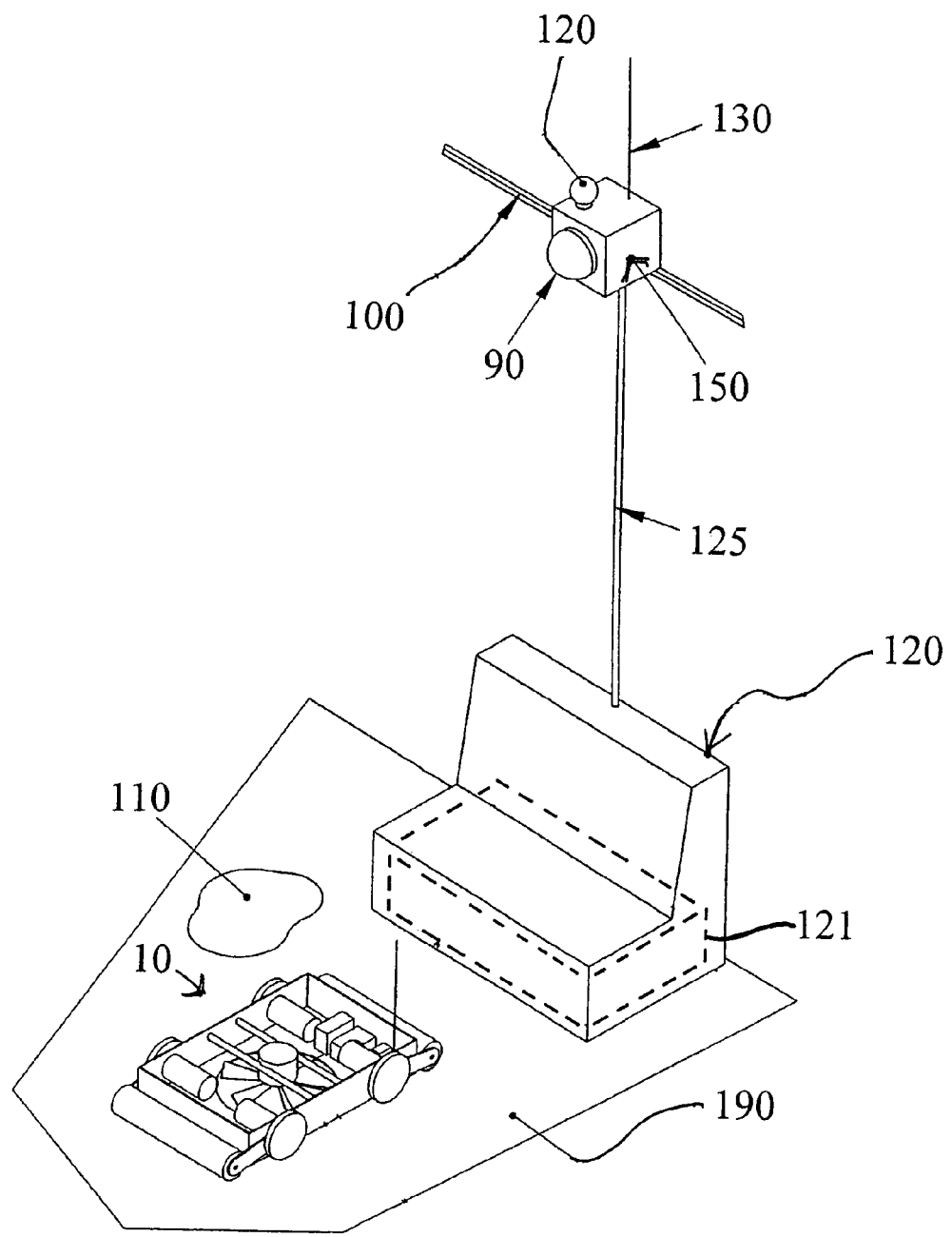
FIG. 2 is a schematic illustration, not to scale, showing the robotic vehicle of FIG. 1 together with a tennis court surface and the fence mounted sensor unit that cooperates with the robotic vehicle.

As shown in FIG. 2, the primary sensor is a thermal imaging camera (TIC) 90. This TIC 90 is preferably fixed to the court fence 100 but it could be mounted in other locations as well. It is designed to guide the ATCDM to wet spots, such as spot 110. A rain detector 120 detects the onset of rainfall, the cessation of rainfall and also the amount of rain. When the ATCDM is not in use, it is stored in a storage unit 121 on the court that is preferably located in a bench 120. This storage unit 121 will secure the ATCDM, charge the on-board battery 40 and will protect the ATCDM from the elements and people.

The size of the robotic vehicle 10 will preferably be between 2 to 4 feet wide by 2 to 4 feet long. The platform or chassis 20 will be approximately 1 foot high and supported by 4 soft rubber no-mar wheels 21-24. The embodiment shown in FIGS. 1 and 2 is steered by "skid steering," known in the art. Chassis 20 carries sponge roller support mechanisms 71a, 71b, 72a,72b, a support for the battery 40 and controller 50 and other miscellaneous equipment including the data transmitter and receiver 140 and antenna 150.

Each motor 31-34 is powered by the on board battery pack 40 and controlled by the controller module 50. The sponge rollers 61,62 are mounted on the front 27 and rear 28 of the chassis 20. The sponge rollers 61,62 are raised and lowered by arms 71a,71b,72a,72b and drive mechanism (not shown) that is controlled by the controller module 50. The rollers 61,62 are raised during sharp steering and to preserve the rollers' life. The rollers 61,62 are lowered either when drying a wet spot 110 on the court 190 or when sponge rolling the entire court 190.

Located on top of the court fence 100 is an enclosure 150 that houses the rain detector 120 and thermal imaging camera 90 and a data transmitter/receiver antenna 130. Below this enclosure 150 is a bench 120 for players to rest. When not in use, the ATCDM is stored in a secure and fully enclosed storage unit 121, shown in phantom, built in underneath bench 120. A conduit 125 connects the electronics inside the storage unit 121 to the enclosure 150. When the ATCDM is inside its housing 121, the ATCDM battery 40 is being charged. The housing also keeps harmful sun rays off of the sponge rollers and wheels to prolong their life expectancy.

Figure 3:
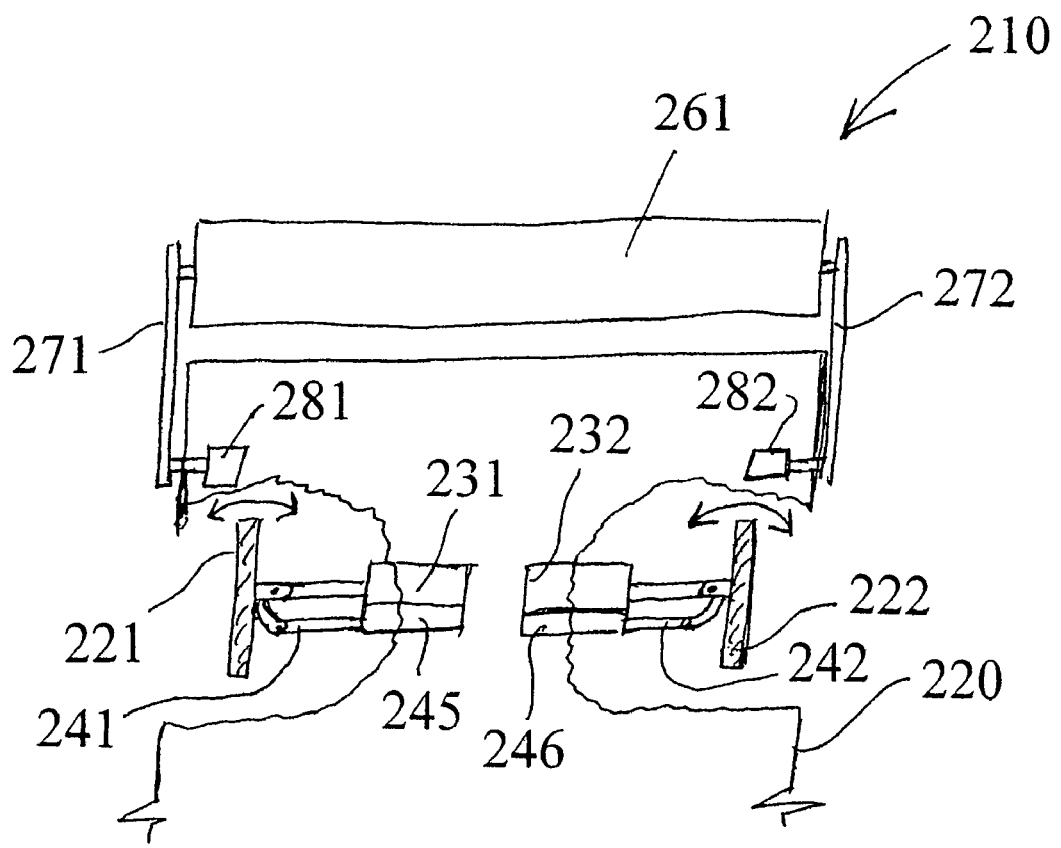
FIG. 3 is a plan view, partially broken away, of the front section of an alternate robotic vehicle having a different steering mechanism and a different sponge roller lift mechanism.

FIG. 3 is a schematic illustration of the front portion of an alternate embodiment of robotic vehicle 210. Chassis 220 is shown broken away to illustrate front wheels 221 and 222. Wheels 221 and 222 are separately powered by electric motors 231 and 232, respectively. Steering arms 241 and 242 are controlled by steering actuators 245 and 246, under automatic control of the on-board controller (not shown in FIG. 3).

Sponge roller 261 is carried by movable arms 271,272. Arms 271,272 are carried by chassis 220. Roller 261 is raised and lowered by motors 281,282, respectively, under automatic control of the on-board controller (not shown).

An identical steering and sponge roller lift to that shown in FIG. 3 is preferably also utilized for the rear wheels and rear sponge roller lift. The same mechanism for the rear is not shown or described for the sake of brevity. The independent, four wheel steering thereby provided eliminates the need for the robotic vehicle 210 to make 180° turns as it sponge rolls the court. It simply goes back and forth on adjacent swaths.

The robotic vehicle preferably has four drive wheels, all separately powered. It is within the scope of the invention to have a three wheeled robotic vehicle, with a single, rear drive wheel, which would also be the steering wheel. However, the robotic vehicle with four wheel drive, four wheel steering, front and rear sponge rollers is more stable and is the preferred design.

Operation

During a rain storm, the rain detector or rain sensing means 120 senses the onset of rain and will indicate to the controller module 50 that there is rain. After the rain stops, sensing means 120 senses the cessation of rain and a "no-rain" timer component of rain sensing means 120 will start. When the "no-rain" timer reaches a preset point (or predetermined time), an actuation signal is sent from rain sensing means 120 to the controller 50. The ATCDM 10 will emerge from its housing 121, inside bench 120, and sponge roll the entire court 190, pushing all the water to the side(s) of the court, then return to its housing for recharging.

During this time period, the court surface will begin to dry. After a preset period of time, the TIC 90 will scan the court looking for wet sports, such as spot 110. The TIC 90 will see wet spot 110 as areas that are a different temperature than the rest of the court. After the TIC 90 has mapped the wet spots, it transmits the location of wet spots to the controller module 50. The ATCDM 10 will emerge from its housing 121 and sponge roll the wet spots such as 110. Fan 80 will turn on to aid in the drying.

If it begins to rain again while the ATCDM 10 is operating, the ATCDM 10 will return to its housing. If the rain was slight, then the ATCDM 10 may be able to skip the full court sponge roll and wait a few minutes for the TIC 90 to begin surveying for wet spots.

The ATCDM will have sensors known in the art around itself to indicate an obstruction. The ATCDM 10 will also have an internal mapping program of the court stored in memory as known in the art to aid the ATCDM 10 in staying away from the fence, net and other obstacles. A similar program is used in numerous existing systems for tracking robots. This program will tell the ATCDM 10 how to do the initial full court drying stage and well as guide it to the wet spots, then return to storage unit 121.

Tennis court sponge rollers 61 and 62 are known and are currently used to manually roll a court dry. Robotic controllers 50 are also known in the prior art. The thermal imaging camera or TIC 90 is known in the art and is preferably similar to those used in night vision military, maritime navigation and for breast thermography scanning in hospitals.

The foregoing description of the invention has been presented for the purposes of illustration and description and is not intended to be exhaustive or limit the invention to the precise form disclosed. Modifications and variations are possible in the light of above teaching. The embodiments were chosen and described to best explain the principles of the invention and its practical application to thereby enable others skilled in the art to best use the invention in various embodiments and other various modifications suited to the particular use contemplated. The scope of the invention is to be defined by the following claims.

What is claimed is:

1. Apparatus for automatically sensing rainfall on a flat, paved surface and for automatically drying said surface, comprising:

(a) a robotic vehicle having:
a chassis,
at least one drive wheel connected to said chassis,
at least one steering wheel connected to said chassis,
a power supply for said drive wheel, said power supply carried by said chassis,
at least one sponge roller carried by said chassis,
means for raising or lowering said sponge roller,
controller means carried by said chassis, said controller means being connected to and controlling said power supply for said drive wheel, said steering wheel, and also being connected to and controlling said means for raising and lowering said sponge roller, and (b) a sensing unit having:
rain sensing means for sensing the onset and cessation of rainfall,
thermal imaging means for scanning said flat, paved surface and sensing the presence of an area of wetness on said surface, and
storage and transmitting means for storing data from said thermal imaging means, and from said rain sensing means, and transmitting said data to said controller means on said robotic vehicle.

2. The apparatus of claim 1 wherein said robotic vehicle has four drive wheels, wherein each of said drive wheels is powered by an electric motor under control of said controller means.

3. The apparatus of claim 2 wherein each of said four drive wheels is steerable.

4. The apparatus of claim 3 further comprising a second sponge roller.

5. The apparatus of claim 4 further comprising a drying fan carried by said chassis.

6. A method of automatically drying a flat, paved surface using a robotic, self-propelled vehicle equipped with a roller sponge, a drying fan, a drive and navigation system all under on-board computer control, wherein said surface becomes wet by periodic rainfall, comprising the steps:
automatically sensing the onset of rainfall on said flat, paved surface,
automatically sensing the cessation of rainfall on said flat, paved surface,
waiting a predetermined period of time after said cessation of rainfall,
automatically sponge rolling said flat, paved surface,
automatically scanning said paved surface with a thermal imaging camera to detect portions of said paved surface that remain wet,
automatically recording the location of said detected portions of said paved surface that remain wet,
automatically transmitting said recorded locations of wet areas to said robotic vehicle positioned on or adjacent to said paved surface,
automatically actuating said robotic, self-propelled vehicle and moving said vehicle to said wet areas, and
automatically sponge rolling and fan drying each of said wet areas by said robotic vehicle.

* * * * *